(12) United States Patent
Alvarez et al.

(10) Patent No.: US 9,422,062 B2
(45) Date of Patent: Aug. 23, 2016

(54) AIR INTAKE ARRANGEMENT FOR A VEHICLE, IN PARTICULAR AN AIRCRAFT

(75) Inventors: Franck Alvarez, Toulouse (FR); Emeric Chancerelle, Toulouse (FR); Alain Porte, Colomiers (FR); Damien Prat, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1245 days.

(21) Appl. No.: 12/597,071

(22) PCT Filed: Apr. 14, 2008

(86) PCT No.: PCT/FR2008/000516
§ 371 (c)(1),
(2), (4) Date: Oct. 22, 2009

(87) PCT Pub. No.: WO2008/142289
PCT Pub. Date: Nov. 27, 2008

(65) Prior Publication Data
US 2010/0087132 A1 Apr. 8, 2010

(30) Foreign Application Priority Data
Apr. 24, 2007 (FR) .................................... 07 02956

(51) Int. Cl.
*B64D 33/02* (2006.01)
*B64D 33/08* (2006.01)
(52) U.S. Cl.
CPC ............. *B64D 33/08* (2013.01); *B64D 33/02* (2013.01); *B64D 2033/0286* (2013.01)
(58) Field of Classification Search
CPC ...................................................... B64D 33/02

USPC ........................................... 454/76; 244/53 B
See application file for complete search history.

(56) References Cited

U.S. PATENT DOCUMENTS 3,446,223 A * 5/1969 Hancock ...................... 137/15.2
3,618,876 A * 11/1971 Skidmore et al. ........... 244/53 B
(Continued)

FOREIGN PATENT DOCUMENTS

FR 2 879 563 6/2006
FR 2 879 564 6/2006
(Continued)

OTHER PUBLICATIONS

International Search Report dated Nov. 26, 2008 w/ English translation.
(Continued)

*Primary Examiner* — Steven B McAllister
*Assistant Examiner* — Samantha Miller
(74) *Attorney, Agent, or Firm* — Dickinson Wright PLLC

(57) ABSTRACT

Disclosed is an air intake arrangement for an aircraft. The arrangement includes an air intake orifice, which is configured to bleed off a flow of external air, pass the external air through at least one air passage channel and ventilate a confined zone of the aircraft. An aerodynamically controlled shut-off means, comprised of a controllable mobile element and control means, is configured to regulate flow of the external air through the air passage channel to vary a cross section of the air passage channel relative to aircraft speed. The control means are arranged in the air passage channel and include an aerodynamic surface configured to apply a lift force to the control means to vary the cross section of the air passage channel as the flow of external air passes through the channel and toward the confined zone.

7 Claims, 4 Drawing Sheets

(56) References Cited

U.S. PATENT DOCUMENTS

| | | | |
|---|---|---|---|
| 3,664,612 A | | 5/1972 | Skidmore |
| 3,792,584 A | * | 2/1974 | Klees .............................. 60/204 |
| 4,174,083 A | * | 11/1979 | Mohn .......................... 244/53 B |
| 4,193,262 A | * | 3/1980 | Snell .............................. 60/761 |
| 4,346,860 A | * | 8/1982 | Tedstone .................... 244/53 B |
| 4,418,879 A | * | 12/1983 | Vanderleest ................ 244/53 B |
| 4,641,678 A | * | 2/1987 | Haas et al. ................... 137/15.1 |
| 4,844,382 A | * | 7/1989 | Raisbeck .................... 244/53 B |
| 5,088,660 A | | 2/1992 | Karanian |
| 5,145,126 A | * | 9/1992 | Patilla ......................... 244/53 B |
| 6,050,527 A | | 4/2000 | Hebert |
| 6,082,669 A | * | 7/2000 | Bardagi et al. .............. 244/53 B |
| 7,461,814 B2 | * | 12/2008 | Hein et al. ................... 244/53 B |
| 2006/0060697 A1 | * | 3/2006 | Beaufort ...................... 244/53 B |
| 2006/0219475 A1 | * | 10/2006 | Olsen et al. ................... 181/214 |
| 2008/0315034 A1 | * | 12/2008 | Vauchel et al. ................. 244/54 |
| 2009/0111370 A1 | * | 4/2009 | Porte et al. ...................... 454/76 |
| 2009/0253361 A1 | | 10/2009 | Porte |
| 2010/0087132 A1 | * | 4/2010 | Alvarez et al. .................. 454/76 |
| 2010/0163678 A1 | * | 7/2010 | Gregory et al. ........... 244/134 B |

FOREIGN PATENT DOCUMENTS

| | | |
|---|---|---|
| FR | 2879564 A1 * | 6/2006 |
| GB | 707 881 | 4/1954 |
| WO | 2006/067296 | 6/2006 |
| WO | 2006/067299 | 6/2006 |

OTHER PUBLICATIONS

Written Opinion of the International Searching Authority with English translation.

* cited by examiner

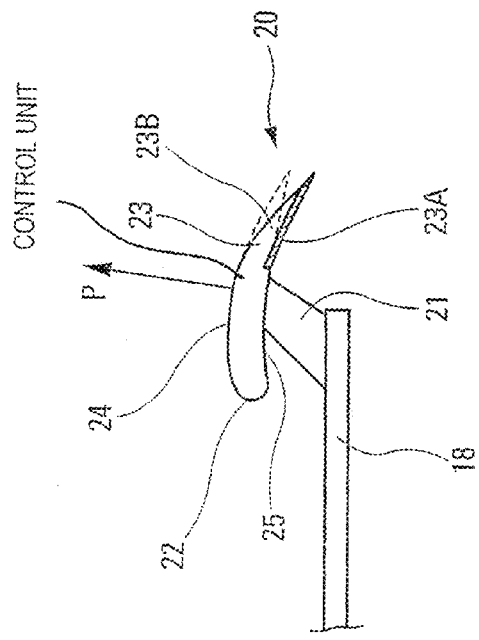
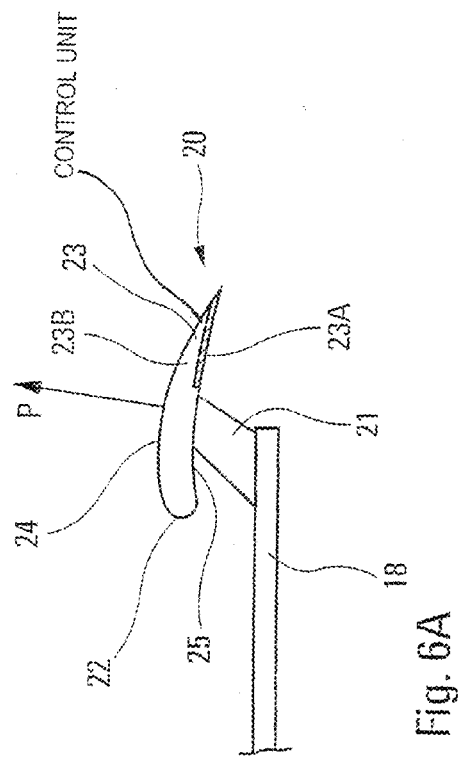
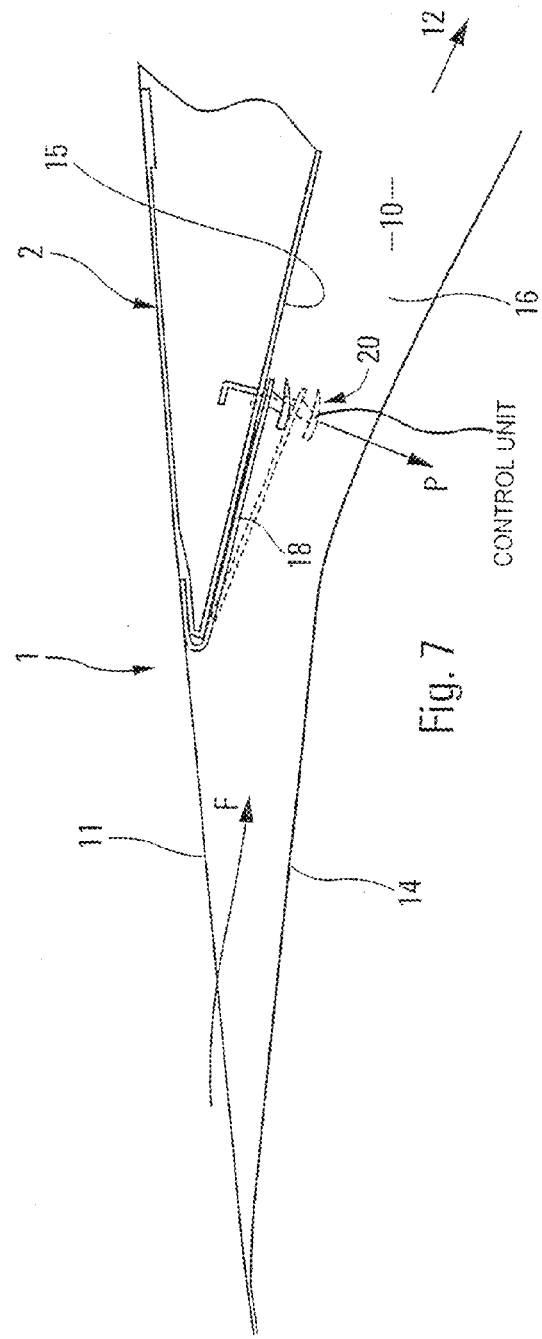

AIR INTAKE ARRANGEMENT FOR A VEHICLE, IN PARTICULAR AN AIRCRAFT

FIELD OF THE INVENTION

The present invention relates to an air intake arrangement for a vehicle, particularly for an aircraft, comprising an air passage channel with an air intake orifice.

BACKGROUND OF THE INVENTION

It is known that such air intake arrangements are in widespread use in the field of aeronautics, particularly, although not exclusively, for the purposes of renewing the air in a confined zone containing temperature-sensitive equipment and/or hazardous surroundings, of the flammable or explosive type, which require the zone to be continuously ventilated in order to avoid any risk of equipment malfunction or surrounding incident.

This is the case in particular with numerous mechanical and/or electrical devices provided in the confined annular zone between the nacelle and the outer fan case and compressor casing of an aircraft turbojet engine. These devices, such as the fades (full authority digital engine control), the accessory relay box (gearbox), the engine oil reservoir, the fluidic components, etc. for example, which are generally fixed all around the external casing and thus lie in the confined zone, are ventilated with external air that enters the arrangement through the air intake orifice to flow along the channel formed in the nacelle and be disseminated, on leaving the channel, in the confined zone. The devices, and also any oil or other vapor emanating from this zone, are ventilated with external fresh air disseminated by the air channel, contributing toward ensuring correct operation thereof.

In order to meet current legislation that requires that the appropriate confined zone have an appropriate amount of air renewed per unit time, the air passage channel of the arrangement has a preset cross section that allows enough air to flow through the channel that, on leaving it, the confined zone containing the devices that require ventilation has its air renewed.

However, because the amount of external air entering the air channel of preset cross section is dependent in particular on parameters associated with the speed of the aircraft and the altitude thereof, it is difficult for the devices that need to be cooled and the vapor that needs to be expelled to be ventilated optimally.

The problem is that although the external air entering the channel of preset cross section of the arrangement via the air intake orifice upstream and leaving downstream of this channel is sufficient in quantity to ventilate the devices correctly when the aircraft is rolling along the ground, in a take-off phase or on standby, and therefore at low speed, when the aircraft is in cruising flight at maximum speed and maximum altitude, the flow rate of air leaving the channel of the arrangement toward the zone that needs to be ventilated is, on the other hand, far too great. Measurements have revealed that, in this phase of flight, the air circulating in the confined zone through the channel of the arrangement was renewed twice as often as was required. Furthermore, the air entering the confined zone gives rise to drag which results in a loss of aircraft speed and therefore in an increase in fuel consumption of said engine.

In order to remedy these disadvantages, documents WO 2006/067296 and WO 2006/057299 describe air intake arrangements comprising shut-off means with a controllable mobile element, which means are associated with said air passage channel, and means of controlling said mobile element which are actuated, either deliberately by the pilot of said aircraft or, advantageously, automatically. In the latter instance, said control means comprise a variable-volume reservoir —cylinder/piston assembly, bladder, bellows, etc.,— which receives the total pressure exerted on said aircraft by the fluid through which said aircraft is moving and which is connected to said controllable mobile element. However, because the pressure is not stable locally this system cannot be optimal. In addition, these control means are cumbersome relative to their environment and have a tendency to give rise to vibrational or imbalance phenomena that require the whole to be reinforced, thus placing a considerable burden on said air intake arrangement. Now, in order to limit aircraft fuel consumption, aircraft designers are attempting to create more lightweight systems.

SUMMARY OF THE INVENTION

It is an object of the present invention to provide a solution to these disadvantages and the invention relates to an air intake arrangement the design of which allows optimal ventilation of a confined zone like that described hereinabove with respect to a turbojet engine, but which may also be a lighting zone or a ventral zone of the airplane (belly fairing) or, more generally, any somewhat enclosed and temperature-sensitive zone of a vehicle in which air renewal is desired.

To this end, according to the invention, the air intake arrangement for a vehicle, particularly for an aircraft, comprising at least one air passage channel with an air intake orifice and which bleeds off a flow of external air that enters said channel at the upstream end, through said air intake orifice, said arrangement comprising shut-off means with a controllable mobile element, which are associated with said channel, and control means for controlling said controllable mobile element so as to vary the cross section of said channel according to the speed of said vehicle between a minimal cross section that allows a minimal air flow rate toward said zone that is to be ventilated and a maximum cross section that allows a maximum air flow rate toward said zone, is notable in that said control means are formed of an aerodynamic surface placed in said air passage channel and capable of generating a lift force under the action of said flow of external air passing through said air passage channel.

Thus, because the lift is proportional to the speed of said flow of external air passing through said channel (and therefore to the speed of said vehicle), the invention makes it possible to obtain shut-off means that are automatic according to the speed of the vehicle, able to make said shut-off means vary the cross section of said channel and modify, according to the phase of flight of an aircraft, the flow rate of air entering the confined zone and, therefore, to provide the devices concerned with the best possible ventilation.

For example, when an aircraft is in cruising flight (at maximum speed and maximum altitude), the cross section of said channel is advantageously and automatically reduced in order to provide a reasonable amount of ventilation to the devices and thus limit the amount of drag generated on the nacelle as a whole by the air absorbed in the confined zone. By contrast, when the aircraft is running along the ground or in take-off phase (at low speed), the cross section of the channel is automatically opened up to its maximum by retracting the mobile element of said shut-off means so that a maximum amount of air can be circulated through the channel and the devices situated in the confined zone can be ventilated appropriately.

Thus, in addition, by virtue of the invention, the amount of air bled by the air intake arrangement is tailored to each phase of flight, thus minimizing the penalty imposed by ventilation on aircraft performance.

For preference, said aerodynamic surface is formed by a profile piece positioned transversely to said channel. An aerodynamic profile piece such as this may comprise a leading edge directed toward said air intake orifice and a trailing edge directed toward said confined zone.

Of course, within said air passage channel, said aerodynamic surface is positioned at a location at which its performance is best. Thus, depending on various parameters including the shapes and dimensions of said air intake orifice and of said air passage channel, said aerodynamic surface may be positioned near said air intake orifice or, alternatively, may be situated at some greater or lesser depth within said air passage channel.

Furthermore, in order to be able to tailor the performance of said aerodynamic surface to suit the circumstances, it is advantageous for the curvature of the profile of said aerodynamic surface to be automatically adjustable so as to enhance the action of said control means. For example, the trailing edge of said aerodynamic surface may be made up of two materials with different thermal expansion coefficients, so as to form a kind of bimetal strip. It then becomes possible, in the case of an aircraft, to accentuate the curvature of the profile of said aerodynamic surface and therefore increase the lift generated thereby when the temperature of the air flow drops, that is to say as said aircraft gains altitude. The maximum curvature and maximum lift can then be obtained when the aircraft is in cruising flight.

Furthermore, said controllable mobile element may be formed of an elastic blade pressing spontaneously against a wall of said air passage channel, said elastic blade being fixed via one of its ends to said channel whereas said aerodynamic surface is fixed to the other end of said elastic blade.

Thus, when said elastic blade is elastically separated from the wall of said channel against which wall it is pressed by the action of the lift generated by said aerodynamic surface, the cross section of the channel is reduced, allowing a reduced flow of ventilating air toward the confined annular zone, whereas when it is pressed against the wall of the channel, the cross section of the channel is then at its maximum, allowing a maximum flow of ventilating air toward said zone.

Of course, such a reduction in the cross section of said channel is dependent on the speed of the vehicle and may be such that said section becomes minimal, allowing a minimum flow of ventilating air. For preference, there is a stop for marking the position of said elastic blade that corresponds to said minimum cross section.

For preference, the end of said elastic blade fixed to said channel is located near said air intake orifice.

Said air passage channel may advantageously have a rectangular cross section, and the width of said elastic blade then corresponds to the width of said rectangular cross section.

BRIEF DESCRIPTION OF THE DRAWING

The figures of the attached drawing will make it easy to understand how the invention may be embodied. In these figures, identical references denote elements that are similar.

FIGS. 6A and 6B illustrate the variation in curvature of the profile of the aerodynamic surface as a function of temperature.

FIG. 7 shows, in an enlarged longitudinal section, an alternative form of embodiment of the shutoff means according to the present invention.

DETAILED DESCRIPTION OF THE INVENTION

Figure 1:
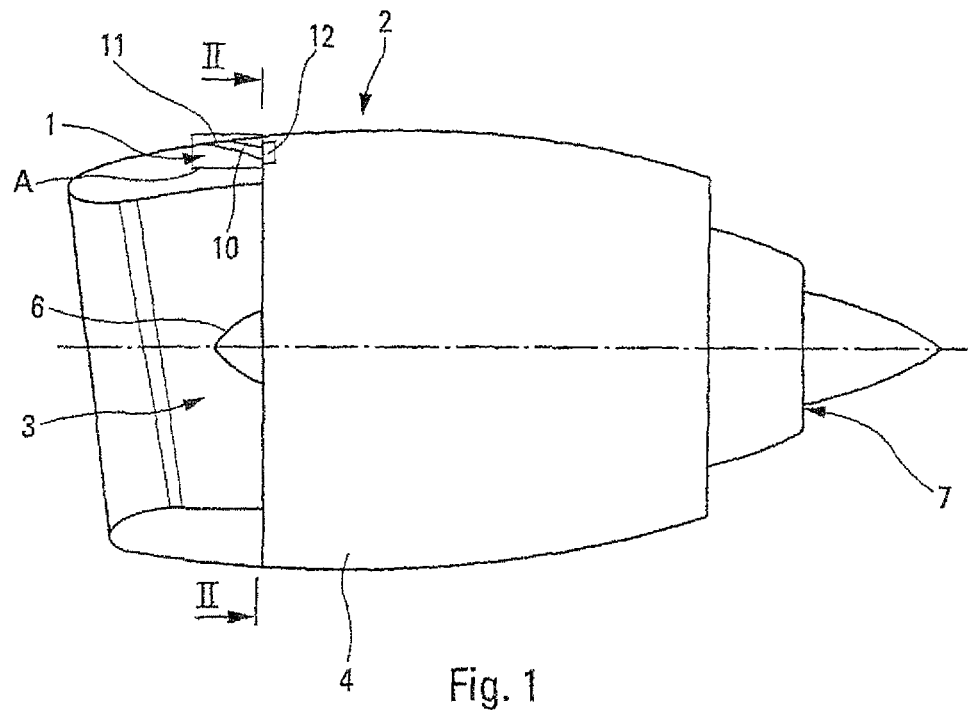
FIG. 1 depicts schematically and in part section the nacelle of a turbojet engine equipped with an air intake arrangement symbolized as A according to the invention.

The air intake arrangement 1 according to the invention and symbolized by a rectangle A in FIG. 1 is provided in a nacelle 2 of an engine mounted on an airplane (not depicted). As shown schematically by FIGS. 1 and 2, the nacelle 2 comprises, in the usual way, an air intake front part 3 for supplying the engine with air, an intermediate part 4 surrounding the external casing 5 of the fan 6, the engine compressors and the combustion chamber and turbine, from which there emerges the external casing of the jet pipe 7 and its cone.

Figure 2:
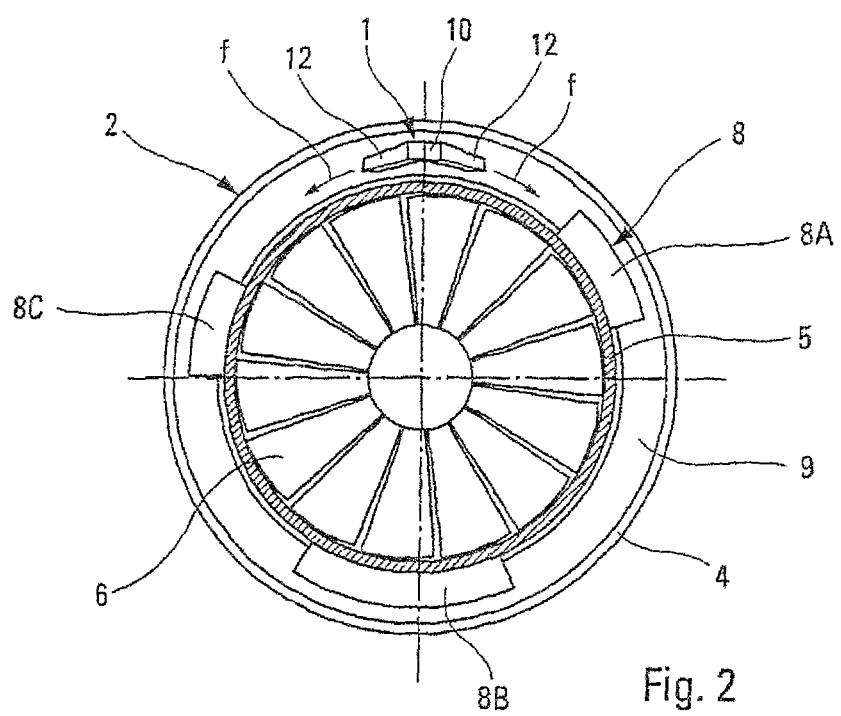
FIG. 2 is an end-on view, in section on II-II of FIG. 1, of said turbojet engine nacelle, showing various devices that require ventilation.

Various mechanical and/or electrical devices or items of equipment 8 are attached to the external casing 5 of the fan and of the compressors, that is to say in the confined annular zone 9 between the nacelle 2 and the external casing 5 of the engine. FIG. 2 symbolically depicts some of the devices 8 that can be found in this zone 9, namely the fadec 8A, the accessory relay box 8B and the engine oil reservoir 8C.

The air in this confined zone 9 is renewed, in order to keep the devices 8 in an appropriate temperature range and allow them to operate correctly, by the air intake arrangement 1 which is situated above the forward part of the nacelle 2 and comprises, for this purpose, an air passage channel 10 created in the structural wall of the front part of the nacelle 2 and that places the external air in communication with the confined zone 9. To do that, the channel 10 has, upstream, an air intake orifice 11 and, downstream, a diffuser 12 in relation to said zone 9, opening into the central part 4 of the nacelle.

The air passage channel 10 is inclined slightly with respect to the exterior surface of the front part of the nacelle 2 and is directed in the downstream direction toward the longitudinal axis of the engine, in order best to bleed and convey the fresh external air along the channel 10 and then discharge it tangentially via the double-outlet diffuser 12 as shown by the arrows f in FIG. 2, on the two sides of the annular confined zone 9.

Figure 3:
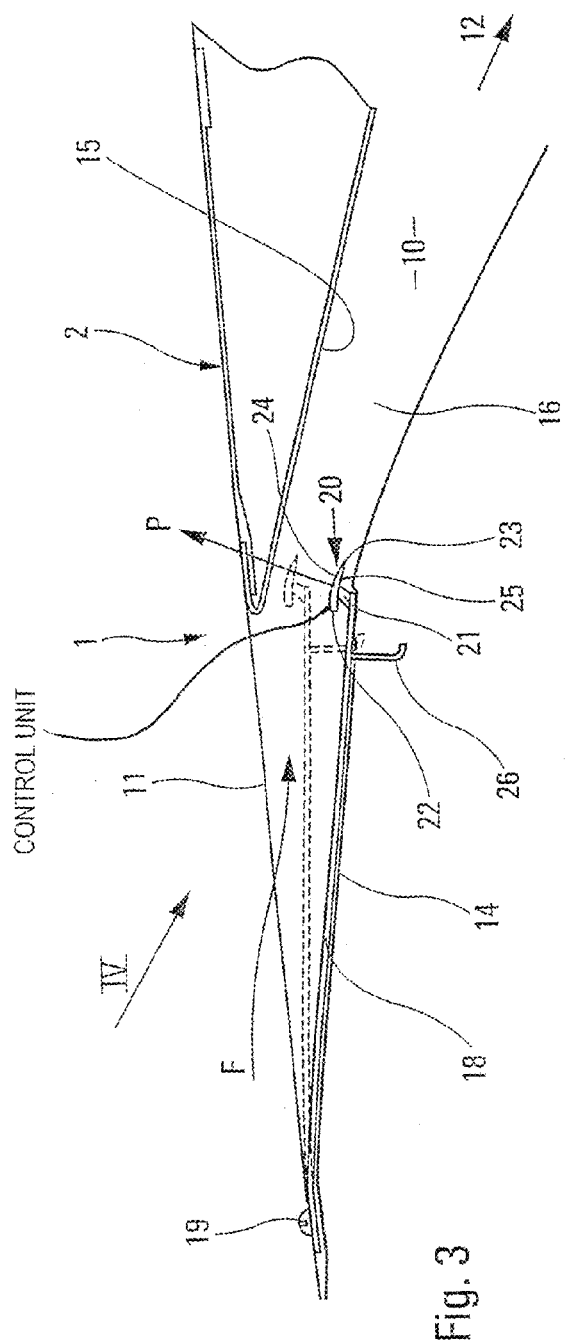
FIG. 3 shows, in an enlarged longitudinal section, one exemplary embodiment of the shutoff means according to the present invention.
Figure 5:
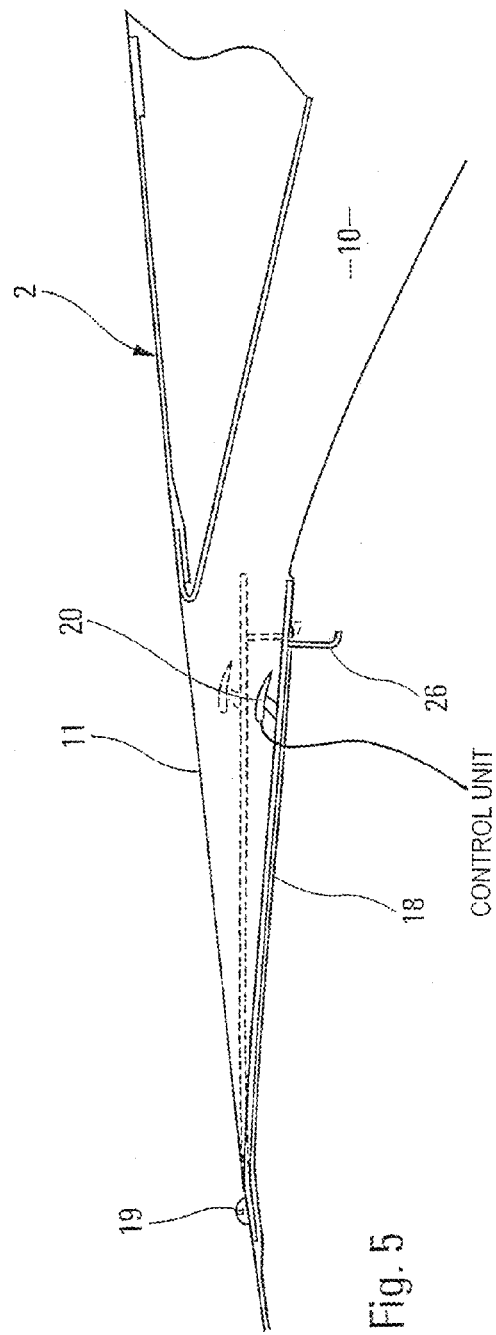
FIG. 5 shows, in a view similar to FIG. 3, a different location of the aerodynamic surface of the air intake arrangement according to the present invention.

In the examples depicted in FIGS. 3, 5 and 7, the overall profile of the channel 10 of the arrangement 1 evolves slightly, that is to say that having converged downstream of its tangential air intake orifice 11, it diverges somewhat toward the diffuser 12 and its cross section becomes rectangular. The channel 10 is delimited by a lower wall 14, an upper wall 15 and two side walls 16 and 17.

According to the present invention, the cross section of the channel 10 is rendered adjustable by virtue of aerodynamically controlled shutoff means capable of regulating the flow rate of ventilating air flowing through the channel 10 toward the confined zone 9 according to the speed of the airplane.

Figure 4:
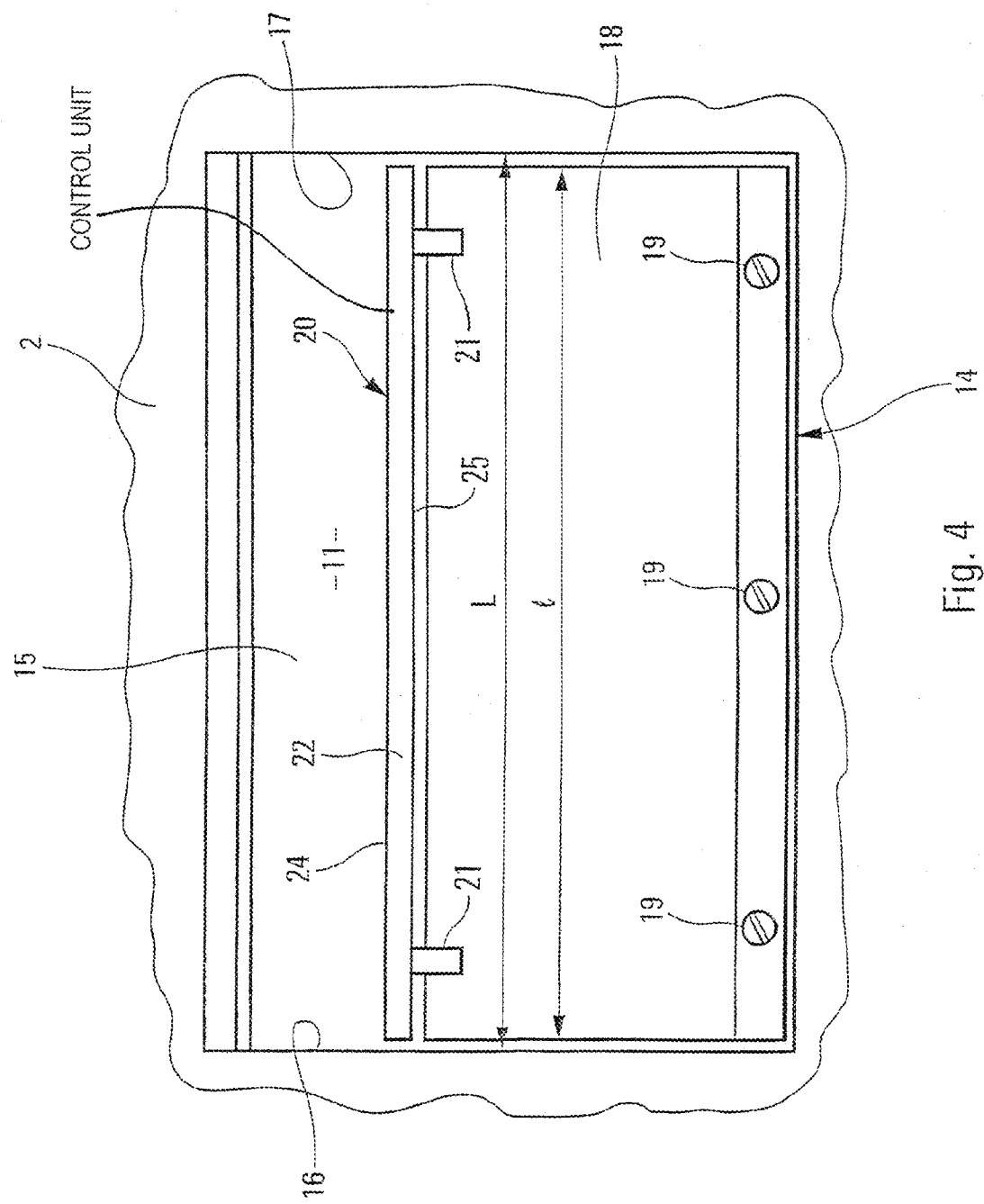
FIG. 4 is a view in the direction of arrow IV of FIG. 3.

In the embodiment illustrated in FIGS. 3 and 4, said shutoff means comprise an elastic blade 18, of rectangular shape, of which one end is fixed near the air intake orifice 11, for example using screws 19, and of which the width $\lambda$ is slightly less than the width P of the channel 10. The elastic blade 18 is housed in said channel 10 and presses spontaneously against the lower wall 14 thereof.

At its inner end, the opposite end to the screws 19, the elastic blade 18 carries an aerodynamic profile piece 20 via mounts 21 that hold said profile piece clear of said elastic blade 18.

Said aerodynamic profile piece 20 is inside said channel 10 and runs transversely with respect thereto. It has a leading edge 22 directed toward the air intake orifice 11, a trailing edge 23 directed toward the diffuser 12, an extrados 24 facing the upper wall 15 and an intrados 25 facing the lower wall 14.

Thus, when the airplane carrying the nacelle 2 moves along, a flow of air (symbolized by the arrow F) enters the channel 10 through the air intake orifice 11. The result of this is that this airflow F generates a lift force P applied to said aerodynamic profile piece 20 and that this lift force P tends, against the inherent elasticity of the elastic blade 18, to move this blade away from the lower wall 14 and closer to the upper wall 15.

The elastic blade 18 therefore acts as a shutter.

Obviously, the deformation of the elastic blade 18 in the shut-off direction is all the greater the greater the lift force P, that is to say the greater the airplane speed.

The maximum extent to which the channel 10 can be shut off by the elastic blade 18 is set by a stop 26, for example consisting of a hook passing through the lower wall 14 and able to collaborate with the opposite face thereof to the channel 10.

Thus, the passage section for the flow F of air through the channel 10 can vary, as a function of airplane speed, between a maximum value for which the elastic blade 18 is pressed against the lower wall 14, and a minimum value determined by the stop 26.

The embodiment of FIG. 5 is in all respects similar to that of FIGS. 3 and 4 except as regards the location of the aerodynamic profile piece 20. Specifically, in this instance, said aerodynamic profile piece, while being situated in said channel 10, is positioned facing the air intake orifice 11 rather than being situated relatively deep within the channel 10, as shown in FIG. 3. FIGS. 3 and 5 illustrate that the position of the aerodynamic profile piece 20 in the channel 10 can be optimized to suit the characteristics of the airflow F, and therefore as a function of the air intake orifice 11 and of the channel 10.

FIGS. 6A and 6B depict an aerodynamic profile piece 20 the trailing edge 23 of which consists of two back-to-back blades 23A and 23B that have different thermal expansion coefficients. Thus, as illustrated in FIG. 6B, the curvature of the profile piece 20 may increase as the temperature of the flow F of external air drops, it then being possible for this curvature to be at a maximum when the aircraft is in cruising flight.

FIG. 7 depicts an alternative form of embodiment in which the elastic blade 18 is fixed to the upper wall 15 and the extrados of the profile piece 20 is directed toward the lower wall 14. In this embodiment, the channel 10 is shut off downward, whereas in the example of FIGS. 3 and 5, it is shut off upward.

The invention claimed is:

1. An air intake arrangement for an aircraft, comprising:
   at least one air passage channel in fluid connection with an air intake orifice, with the air intake orifice configured to bleed off a flow of external air to enter into the air intake orifice at an upstream end of the at least one air passage channel, pass through said at least one air passage channel, and ventilate a confined zone of the aircraft; and
   an aerodynamically controlled shut-off unit comprised of:
   a controllable mobile element configured to regulate flow of the external air through the at least one air passage channel toward the confined zone of the aircraft to vary a cross section of the at least one air passage channel relative to speed of the aircraft, and
   a control unit configured to control said controllable mobile element to vary the cross section of said at least one air passage channel relative to the speed of said aircraft, wherein the controllable mobile element is configured to regulate the flow of the external air through the at least one air passage channel by reducing the cross section of the at least one air passage channel during cruising flight to flow the external air through the at least one air passage channel at a minimal air flow rate toward said confined zone, and opening up the cross section of the at least one air passage channel during at least one of ground or take-off phase to flow the external air through the at least one air passage channel at a maximum air flow rate toward said confined zone,
   wherein
   said controllable mobile element is formed of an elastic blade configured to press spontaneously against a wall of said at least one air passage channel, with said elastic blade being fixed at one end to said at least one air passage channel, and
   said control unit is arranged in said at least one air passage channel, with said control unit including an aerodynamic surface formed by a profile piece positioned completely within and transversely to said at least one air passage channel, said profile piece having a single portion fixed to another end of said elastic blade and having at least one free end, said aerodynamic surface being configured to, responsive directly to airflow within the at least one air passage channel, generate a lift force to the profile piece to lift said elastic blade to reduce the cross section of the at least one air passage channel as said flow of external air passes through said at least one air passage channel toward said confined zone of the aircraft.

2. The arrangement as claimed in claim 1, wherein said profile piece comprises a leading edge directed toward said air intake orifice and a trailing edge directed toward said confined zone.

3. The arrangement as claimed in claim 1, wherein said aerodynamic surface is formed by a profile piece having a curvature, in which the curvature is automatically adjustable to enhance control of said control unit.

4. The arrangement as claimed in claim 3, wherein said curvature is adjustable relative to temperature of said flow of external air, wherein said curvature increases as the temperature of said flow of external air drops.

5. The arrangement as claimed in claim 1, wherein the end of said elastic blade that is fixed to said at least one air passage channel is located proximate to said air intake orifice.

6. The arrangement as claimed in claim 1, wherein said at least one air passage channel has a rectangular cross section, and the elastic blade has a width corresponding with a width of said cross section of said at least one air passage channel.

7. The arrangement as claimed in claim 1, further comprising a stop configured to mark a position of said elastic blade that corresponds to said minimum cross section of said at least one air passage channel.

* * * * *